Dec. 7, 1965   L. B. SCOTT   3,222,682
TRAFFIC SPEED VIOLATION RECORDERS, AND THE LIKE
Filed Dec. 4, 1964   4 Sheets-Sheet 1

INVENTOR.
Loyce B. Scott,
BY Thos. R. Banning
Atty.

Dec. 7, 1965  L. B. SCOTT  3,222,682
TRAFFIC SPEED VIOLATION RECORDERS, AND THE LIKE
Filed Dec. 4, 1964  4 Sheets-Sheet 3

INVENTOR.
Loyce B. Scott,
BY *Atty.*

Dec. 7, 1965    L. B. SCOTT    3,222,682
TRAFFIC SPEED VIOLATION RECORDERS, AND THE LIKE
Filed Dec. 4, 1964    4 Sheets-Sheet 4

INVENTOR.
Loyce B. Scott,
BY
Atty.

3,222,682
TRAFFIC SPEED VIOLATION RECORDERS, AND THE LIKE

Loyce B. Scott, Albuquerque, N. Mex., assignor of one-half to Fred. D. Huning, Jr., Albuquerque, N. Mex.
Filed Dec. 4, 1964, Ser. No. 416,025
10 Claims. (Cl. 346—107)

This invention relates to new and useful improvements in traffic speed violation recorders, and the like. This invention discloses certain improvements directed, among other things, to the type of speed violation recorders disclosed in my co-pending application, Serial No. 221,974, filed September 7, 1962, and allowed June 2, 1964, now Patent No. 3,165,373. Accordingly, I shall hereinafter make reference to the structures and combinations of elements disclosed in that earlier case, for simplicity of illustration and description of the presently disclosed and claimed improvements; but in so doing I do not intend to limit myself, except as I may do so in the claims to follow.

That earlier application discloses structures and operations whereby the time interval for the subject vehicle to traverse a zone of measured length is accurately determined by the production of a starting signal emitted at the instant the vehicle entered the measured zone, which starting signal causes an accurate time counting element to commence time count; together with production of a terminal signal emitted at the instant the vehicle has completed traverse of the measured distance of the zone. That earlier application includes and discloses means to accomplish the foregoing operations of time counting the traverse of the distance of such zone, to a high degree of accuracy, even when the measured zone is of length corresponding to the length of the wheel base of the vehicle, the proximity of following vehicles, the presence of more than one set of wheels on the leading vehicle when a trailer is being pulled, and other physical properties of the vehicle whose speed is being determined, and when the lawful speed is high, as for example, of the order of 75-100 m.p.h.

That earlier application also discloses means to produce a photographic record of the vehicle's speed when such speed exceeds the lawful value for the location where the testing equipment is installed, such photographic record also showing at least a portion of the vehicle body or structure, and if desired, the license plate, for purposes of establishing a photographic record of the identity of the offending vehicle. Provision is also made, in that case, for causing such photographic record to be made only when the recorded speed of the vehicle to traverse the measured zone, is as high as or higher than the lawful speed. Thus needless or non-useful operations of the equipment are prevented, with corresponding savings of photographic tape or film, and other savings which will be apparent. It is evident that such a single photographic record may be produced to show a desired portion of the exterior of the vehicle—being, in that earlier application, shown as photographing the rear portion of the vehicle, since the license plate is almost universally carried at the rear end of the vehicle, according to custom or statutory requirement.

In some cases it may be desirable to produce a photographic record of the front end portion of the vehicle, either as a single recording produced before the vehicle has progressed so far as to be beyond the photographing range for such front vehicle recording operation; or as a double recording—including simultaneous photographs produced by properly located and installed cameras for production of recordings of both the front and rear end portions of the offending vehicle. The following explanations are therefore pertinent:

Under some statutory provisions, or court rulings respecting introduction of proof as to the identity of the driver of the offending vehicle, it is either desirable or definitely necessary to include photographic proof as to the driver's appearance and pose at the instant of photographing—whether he was attending to the necessary driver functions, observing the road ahead, hand or hands on the steering wheel, and other important driving conditions and functions. Although such a picture is necessarily produced showing the aforesaid driver conditions at a given instant, such driver conditions at that instant of production of the picture will substantially evidence what he had been doing, and his posture during the preceding short interval elapsed since commencement of the time lapse to traverse the measured distance. For example, when the length of the measured zone is 120 inches (10 feet), and the vehicle speed is 60 m.p.h., the time interval to traverse such zone is 0.11362 sec., or 113.62 milliseconds, slightly more than one-tenth of a second. Thus the photographic record made at conclusion of traverse of the measured zone is a highly dependable record of the posture of the driver during the time of traverse of the zone.

It is also evident that such a front view recording, to be acceptable, must be of sufficient clarity and sharpness to meet critical analysis in court or elsewhere, to meet acceptable proof requirements. It is also evident that in almost all cases, such a front view recording of the interior of the vehicle, must be taken through the windshield, whether of glass or other conventionally used transparency. Also, that under conditions of high daylight illumination, as for example, bright sunshine against the windshield, reflections of visible light rays (within the visible spectrum), may so seriously interfere with production of an acceptable picture of the interior of the vehicle, as to destroy the probative value of such picture.

In the structure disclosed in that earlier application I have included a flash-light unit located close to the camera by which the picture is taken, together with suitable circuitry to activate such flash-light for a short interval, throwing its illumination (generally under control of a suitable reflector) against the intended exterior of the vehicle, with reflection of its short, intense flash of light, back from the vehicle surface and against the indicating element of the timer. The vehicle surface illumination is also reflected directly back to the camera to produce a record of the viewed portion of the vehicle surface, including, for example, the license plate. That portion of the illumination which is directed back and onto the speed indicating surface of the timer is reflected from such speed indicating surface into the camera lens in such manner as to produce a record of the speed close to the picture record, thus producing simultaneously, the picture and the speed record at the same time.

Such arrangement may, by use of a specialized type of flash-light unit, such as a unit which delivers infra-red light, produce a beam or beams, invisible to the human eye, and of a substantially non-reflecting nature, so that the interior of the vehicle will be reflected back to the camera lens. By use of picture recording film sensitive to infra-red wave lengths, the record produced on the film of the camera will include both the appearance of the exterior of the vehicle and the interior, substantially without blur or other damaging effects from reflections other than those reflections which produce the appearance of the vehicle surface, and the record of vehicle speed. Infra-red flash-light bulbs, and infra-red sensitive photographic films, are well known and suitable for the purposes intended here.

Thus it is evident that the equipment already disclosed in such earlier application may be used to produce the desired recording of the interior of the vehicle, as well as the speed at the instant of flash, by use of the infra-red type of flash-bulb, and the use of photographic film capable of producing the picture when subjected to the infra-red radiation. By the term "infra-red" I contemplate wave-lengths of the order of substantially upwards of 700 mu wave-lengths, and upward.

It is thus evident that such interior picture records, including the recorded speed, may be produced by use of the infra-red flash-light producing bulb and proper sensitive film, under the disclosures of such earlier application.

It next remains to explain the further modification of said earlier disclosures, to produce recordings of both the front end portion of the offending vehicle, including the driver record, and a recording of the outside surface of the rear end portion of the vehicle, including such identification elements as the license plate.

The disclosed equipment of the earlier application includes the timer unit fully shown and described in that case, the speed indicator, and the means to restore the timer to its base or zero position; the camera unit; the flash-bulb unit; the reflector means to direct a portion of the light reflected back, to the speed indicating area and to direct such speed indication light to the camera lens; the starting and the stopping signal producing elements on the roadway; the circuitry; and a source of electrical energy, shown as the battery. When it is desired to produce the speed record directly on the photographic record of the vehicle appearance, as when such duplex record is made of the rear portion of the vehicle, it is evident that both the speed determining and indicating elements should be close together, so that the necessary speed indicating light beam may be properly reflected into the camera lens. Accordingly, the equipment for producing the rear end record is conveniently brought together into a substantially closed unit, for protection against the weather, dust and the like, with the signal producing elements on or adjacent to the roadway, and properly connected into such overall unit.

It is also evident that, in order to produce a recording of the front portion of the vehicle, additional to such rear end record, the same timer unit, speed determining elements, re-setting unit, and directly related elements of the rear record producing installation should be used for delivering the needed signals to the camera by which the front portion of the vehicle is to be recorded. In fact, such relationship is most desirable in order that the front end picture record shall be produced at the same time as the rear end picture and speed recordings are made. Accordingly, the equipment needed for producing the front end record may constitute the simple camera unit, but modified for delivery of the light-flash as an infra-red beam. Thus constituted, the signals for activating the front end camera may be derived from those terminals of the circuitry by which the corresponding elements of the rear end camera are activated, substantially without need of duplication of other elements of the overall installation.

For purposes of ready study and understanding of the structures of the present case I have, however, included in this case the showings of the complete embodiment of the original case, and with circuitry connections of simple form between the front view camera and the elements and circuitry of the earlier application, to cause the front view camera to function and produce its simple picture record in exact synchronism with the operations of producing the rear view recording, and without duplication of the speed recording on the recording produced by such front view camera, since both recordings would constitute a single complete record as desired for complete identification of the vehicle, the speed, and the driver of the vehicle.

Other objects and uses of the invention will appear from from a detailed description of the same, which consists in the features of construction and combinations of parts hereinafter described and claimed.

In the drawings:

FIGURE 1 shows a typical section of roadway comprising a test zone, with the first and second signal producing tapes extended across such roadway, and a vehicle passing through the test zone; and this figure also shows the equipment of the present invention, comprising such equipment as is disclosed in my earlier application, together with the supplemental equipment needed for production of the front view picture, each supported by a post located close to the test zone, with the equipment for producing the full recording, including the record of the speed through the test zone, carried by the rear post, and the necessary supplemental equipment for producing the front end picture carried by the front post, each camera being so supported as to face in the proper direction for producing its intended picture;

FIGURE 2 shows a typical "frame" picture produced by the camera at the rear of the vehicle, including the speed record, and the rear portion of the vehicle, and including the license plate for identification of the vehicle;

FIGURE 3 shows a vertical section through the recording unit of the rear view installation, enclosed in a suitable weather proof housing, being the unit carried by the post at the rear view position in FIGURE 1; and this FIGURE 3 also shows the camera unit in place to receive, through a set of properly located mirrors and lens system, the reflected light from that portion of the speed indicator and timer, at which the speed of the vehicle through the test zone, is shown, to record such speed photographically on the same frame of the film as carries the identifying picture of the rear end portion of the offending vehicle;

Figure 4:
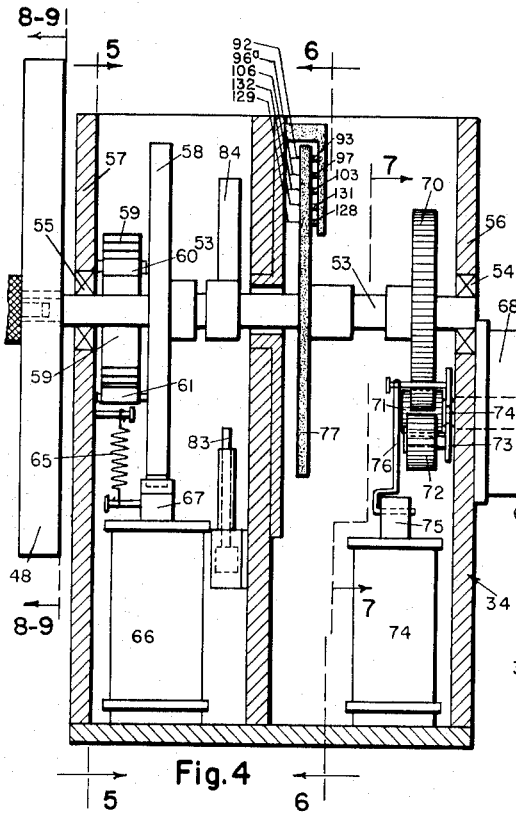
FIGURE 4 shows, on enlarged scale, in section, that portion of FIGURE 3 which illustrates the timing mechanism and directly related elements, the timing elements being shown in their initial or unoperated-time-counting position.
Figure 6:
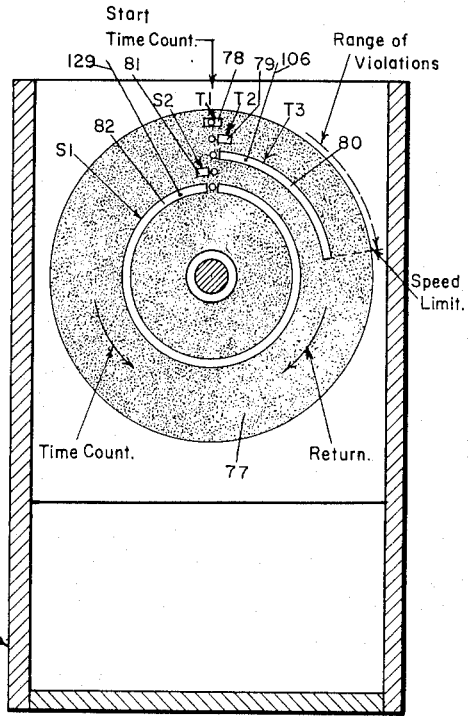
Figure 5:
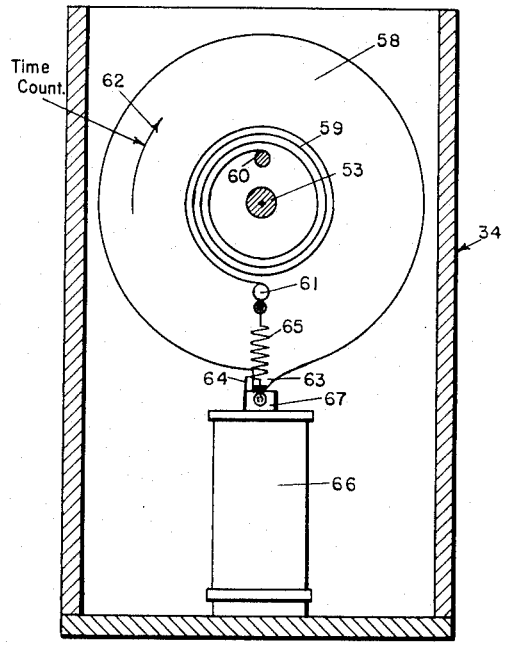
FIGURE 5 shows a cross-section taken on the line 5—5 of FIGURE 4, looking in the direction of the arrows; and this figure shows, by the arrow, the direction of time counting rotation produced by urge of the spiral spring when the timing elements are released by the incoming of the signal from the first tape, the timing elements having not yet been released in the showing of this figure.
Figure 7:
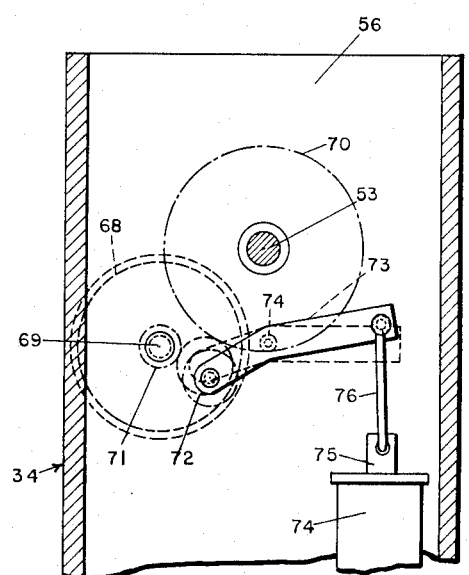
Figure 8:
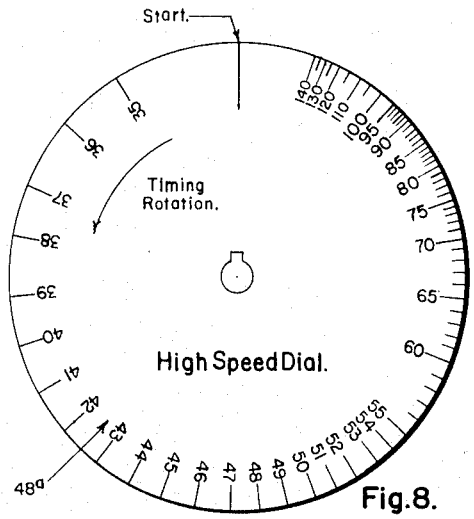
Figure 9:
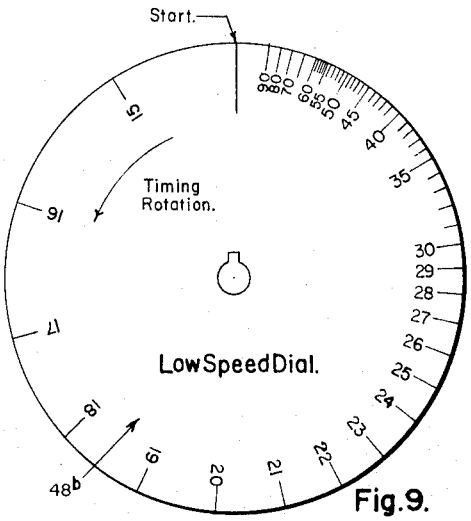
Figure 11:
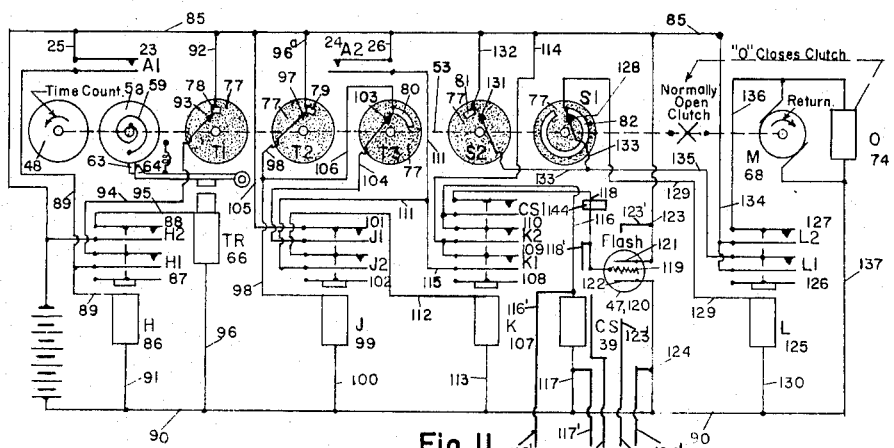
Figure 10:
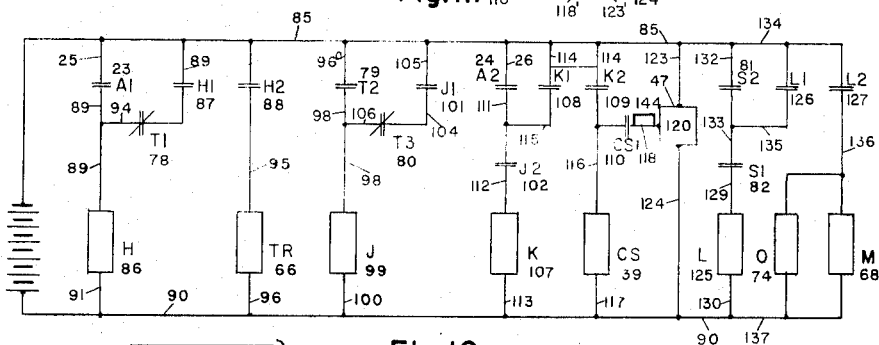
Figure 12:
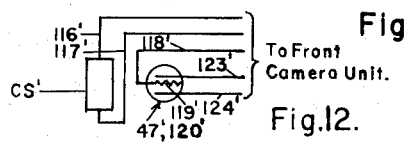

FIGURE 6 shows a cross-section on the line 6—6 of FIGURE 4 looking in the direction of the arrows; and this figure shows principally, the several contact elements (schematically shown) which are under time lapse control, in their relation to the initial or starting position of the timing elements, shown by the arrow; and in this figure I have also included by schematic showing certain contact elements which may, if desired, be separated from such timing unit, this being true in the case of the time lapse counter which produces circuitry changes at the instant of conclusion of that time lapse which corresponds to the specified "speed limit" for which the unit is calibrated, and corresponding to the selected spacing of the two tapes from each other;

FIGURE 7 shows a cross-section taken on the line 7—7 of FIGURE 4, looking in the direction of the arrows; and this figure shows a convenient form of "clutch" by which the timer returning motor may be drivingly engaged with the time count elements, only during the returning (spring re-winding) operation to be performed after the timer has completed slightly less than one complete rotation, to re-set such timer unit to its initial position, preparatory to making the succeeding recording;

FIGURE 8 shows a cross-section taken on the line 8—8 of FIGURE 4, looking in the direction of the arrows; and this figure shows the peripheral speed indicating markings on the mass unit shown at the left-hand side of FIGURE 4, such markings corresponding to a pre-selected "high-speed" recording operation—that is, a recording operation on a section of roadway where the speed limit lawfully proclaimed is "high"; it being noted that the unit shown in this figure is removable from the timer shaft for replacement for some other indicating mass unit;

FIGURE 9 is a section taken on the line 9—9 of FIGURE 4 (being the same section line as is used for FIGURE 8); but the timer element shown in FIGURE 9 is marked with indicia corresponding to a "low" speed lawful speed limit; and the mass of the unit thus shown in FIGURE 9 is different from the mass of the unit shown in FIGURE 8, so that such unit, when used, may be brought into calibration for accurate recording of the "low" speed conditions;

It is here noted that the showings of FIGURES 1 to 9, included, include means for production of the speed of the offending vehicle record, and for production of the record of the license plate, thus being adapted to the production of the rear view recording;

FIGURE 10 shows, schematically, a block diagram of a circuitry by which the desired complete operations produced by the equipment shown in FIGURES 1 to 9, inclusive may be produced; and this figure also shows branch lines extending from certain of the lines which activate or operate the camera and the flash-light, which supplemental lines may be connected to the terminals of the camera control element and the flash-light control of the front view unit, when such front view unit is included in the installation;

FIGURE 11 shows a wiring diagram of circuitry corresponding to the block diagram shown in FIGURE 10, it being noted that such wiring diagram includes several relays of conventional form; and it being understood that other elements such as electronic elements may be used, including transistors where proper, in place of the elements shown in FIGURE 11, and including, if desired suitable electronic delay elements in place of the rotary contact elements shown in portions of FIGURES 6 and 11, as will be hereinafter explained; and FIGURE 11 also shows the same branch or supplemental lines which may be attached to a front picture producing unit, as the supplemental lines shown in FIGURE 10; and FIGURE 12 shows a fragmentary wiring diagram, being a portion of the elements carried by a front view camera, and the terminals to which such supplementary or branch lines of FIGURES 10 and 11, are connected to produce operation of the front view camera harmoniously with the operations of the rear view camera and speed record producing equipment.

In the drawings I have illustrated by present improvements as incorporated into equipment embodying the structures and basic operations disclosed in my earlier application. I have thus chosen to illustrate the present improvements since they may be readily incorporated into such earlier structures and operations; but in so doing I do not intend to limit these improvements to incorporation into or use with such specific earlier speed and violation recording equipment, except as I may do so in the claims to follow.

It thus follows that the showings of the several figures of this application are substantially the same as corresponding figures of the earlier case, but modified or supplemented to incorporate the provisions necessary for production of the front end picture and corresponding interior of the vehicle; and, additionally to make provision for taking the pictures and producing the photographic records by use of infra-red illumination for production of either or both of such records, being the back end of the vehicle, and the front end thereof. Accordingly, I shall describe the various structures herein shown, in general description, except as needed to fully disclose the improvements and their relationship to the earlier disclosed equipment.

Figure 1:
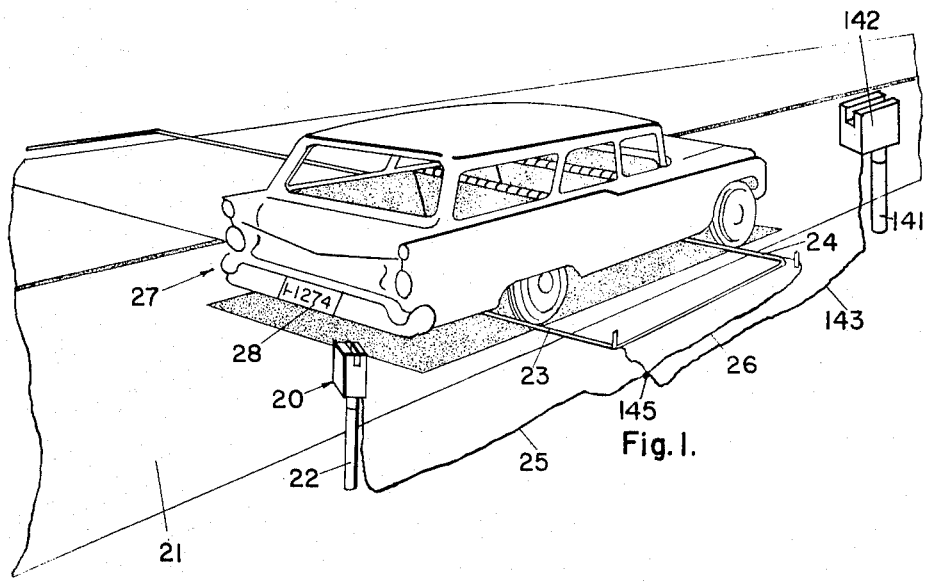
Figure 2:
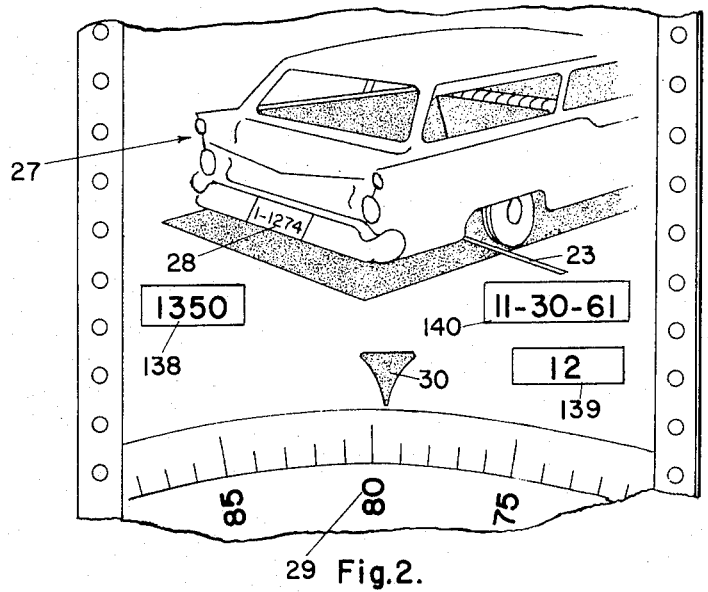

In FIGURE 1 I have shown the vehicle 27 traversing the test zone, which zone is defined by the first signal producing element 23 and the second signal producing element 24, laid across the roadway at the separation which defines the length of the test zone. In this figure the vehicle is shown in its position where it has just completed the length of the test zone and still occupies substantially that length, the front wheels having produced the first signal by crossing the unit 23, and having just produced the second signal by crossing the unit 24.

The post 22 is set backwardly of the first signal production switching element 23, and carries the camera unit 20 for producing the rear end picture and record, for which purpose such camera is pointed forwardly of the roadway at an angle proper to produce such rear end picture. Conveniently, such unit 20 may also carry various of the signal receiving and translating elements to activate the camera when the tested time for traverse of the test zone is less than corresponds to the lawful high spede through such zone. The first and second signals are transmitted over the lines 25 and 26 to such signal receiving and transulating equipment, according to the structures and operations fully disclosed in said earlier application.

To produce the front end photographic recording I have shown the second post 141 located forwardly of the test zone and forwardly of the second signal producing switching element 24 and carries the camera unit 142 for producing such front end picture and record, for which purpose such second camera is pointed rearwardly of the roadway at an angle proper to produce such front end picture. Such second camera unit is activated for production of its picture simultaneously with activation of the first or rear end picture producing camera unit; for which purpose the lines needed to activate such second front end picture producing camera may be carried in the cable or line 143 to a point of junction with the cable or line 25 which extends into the unit 20, with proper connections to those lines of the earlier disclosed equipment necessary to produce activation of both cameras simultaneously. It will be understood that such lines or cables 143 and 25 include sufficient numbers of conductors to provide for the circuitry hereinafter to be described. Such cable 25, and the cable 24 also carry the lines for delivering the first and second signals to the proper elements of the equipment carried in such unit 20.

Figure 3:
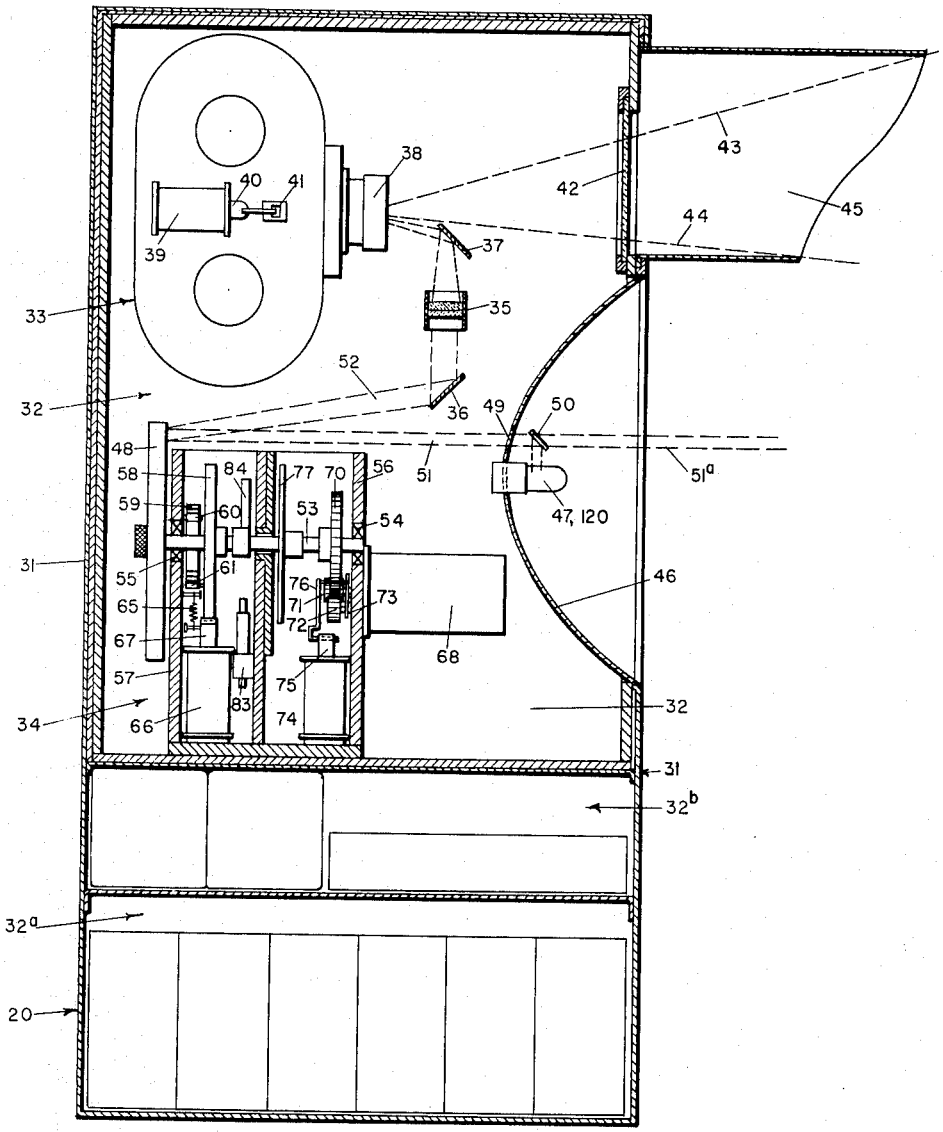

FIGURE 3 shows in detail one of the camera units 20 and 142. Conveniently the various elements for timing and producing the camera activating units, are included in the showing of unit 20; and such elements are also shown in detail in FIGURES 4, 5, 6, 7, 8 and 9, full description of which units is not deemed necessary here, since such units are fully described, and their several operations and inter-operations are also fully described in said earlier application. It is here noted, however, that for convenience such units of said figures are included within the housing of the unit 20, being shown as a portion of the equipment carried by the rear post 22.

Since the front viewing camera is operated simultaneously with the rear view camera it is evident that connections may be carried from the rear camera activating lines to corresponding front camera activating lines for such simultaneous activation of both cameras. Such arrangement is disclosed herein as follows:

Reference to FIGURES 10 and 11, which show, respectively, a block diagram and connections of the overall circuitry (FIGURE 10), and a wiring diagram of such circuitry (FIGURE 11), reveals that the camera activating element CS–39 (see also such element on the camera 33 of FIGURE 3), is activated by current supplied over the lines 116 and 117 (FIGURES 10 and 11), and that the flash-light unit 47–120 (FIGURES 10 and 11), and also FIGURE 3) is activated by potential and current supplied over the lines 123 and 124, and 118 (FIGURES 10 and 11). Also, that energization of the camera solenoid 30 is produced by current supplied over the line 116, and firing of the flash-light is produced by placing potential on the grid 119 over the line 118 (see FIGURE 11); and that such activations are under control of the relay K which is pulled in only when the second signal is received prior to disengagement of the lawful speed limit contact 80 from the stationary contact 103 (see disk 77, FIGURE 11). Accordingly, such lines 116 and 117 may be considered as master lines for activation of the camera, and such line 118 may be considered as a master line for firing of the flash-light. Such being the case, branches of these five lines are carried to the camera and to the flash-light elements of the front picture producing unit 142, over the cable 143. Since such master lines already exist in the unit 20, the branch lines may conveniently be connected to them within such unit 20, and may be included in the cable 25 to the point of junction with the cable 26, from which point an extension cable is carried to the front view unit being the cable 143. Or, the lines 166', 117', 118', and 123' and 124' may be connected to the corresponding lines 116, 117 and 118, and 123 and 124, at the junction point 145 (see FIGURE 1).

For convenience of identification of the supplemental lines above referred to, they have been shown in FIGURES 10 and 11 by such numerals 116'–117', and 123'–124'–118', respectively, for the activation of the front view camera and the front view flash-light. In FIGURE 12 I have also shown, schematically, the camera activating solenoid unit CS'–39', and the flash-light 47'–120'; and the lines 116'–117', and 123'–124'–118', it being understood that the elements shown in FIGURE 12 are connected through the cable 143 to the corresponding lines 116–117, and 123–124–118, either within the unit 20, or to such lines 116–117, and 123–124–118 at the junction point 145 shown in FIGURE 1.

When the flash-lamps are to produce infra-red radiation it is necessary to use a light-source capable of producing an illumination within the infra-red wave-length range, and of sufficient intensity to produce the intensity of infra-red illumination of the interior of the vehicle, needed to produce the desired photographic record. Furthermore, due to the high speed at which the vehicle is travelling (being above the lawful speed), when the photographic record is made, it is also necessary to use a flash-type of infra-red generator having a very short interval of illumination, and a high rate of illumination decay when the excitation of such light source is extinguished. Flash-lamps of the thyratron type, properly selected as to contained gas, and other basic characteristics, are suitable for the intended purpose; such thyratron being fired by shift of its grid potential to or through the critical potential at the instant of firing.

Photographic emulsions sensitive to infra-red radiation in both the near and far infra-red ranges are well known in the photographic arts; and it is not necessary here to specify any special or particular emulsion for use in producing the desired photographic record when the flash-lamp is fired.

It will also be evident that either or both of the flash-lamps (rear and front) may be capable of producing the desired photographic record on suitably chosen photographic emulsion films in the respective cameras; thus making it possible to produce recordings without drawing the vehicle driver's attention to such recording operations by the sudden illumination produced at the instant of firing. This is especially important in the case of the front view recording; since sudden distraction of the driver's attention from his driving requirements might be the cause of an accident.

It will be understood that, as respects the use of infra-red radiating flash-lamps, with provision for firing such lamps at the correct instants for production of recordings of the herein disclosed types, such firings may be produced for production of the intended recordings by use of devices and circuitry other than specifically illustrated and described herein. Accordingly, I do not intend to limit my protection respecting the provision of infra-red radiation producers for producing the desired recordings, to the specific elements and circuitry herein shown and disclosed, except as I may limit myself in the claims to follow.

The solenoid 39 for tripping the camera (either front or back, or both) should be very fast operating, to ensure proper shutter opening just prior to the firing of the corresponding flash-lamp. If desired a delay unit 144 may be interposed in the line 118 leading to the flash-lamp grid 119 for the rear camera, and thus also to the line 118' leading to the grid 119' for the front unit camera flash-lamp. Thus such delay unit will produce a delay of the order of one or a few milli-seconds between the signalling to the solenoid to activate its camera shutter and other elements, prior to firing the flash-lamp, it being remembered that the total time between the first and second signals may be of the order of 113.62 milli-seconds. In other cases the camera shutter and other operations will be fast enough to avoid need of provision of such delay unit. I do not specifically illustrate or describe the details of such delay unit, since various forms of such units, either electronic or other, are well known and widely used in the arts.

I claim:

1. In a traffic speed violation recorder, the combination of vehicle rear end and front end viewing cameras, means to support both of said cameras in position to view the rear and the front portions, respectively, of a vehicle passing through a test zone of pre-determined length, first and second vehicle actuated means constituted to emit first and second signals, simultaneously with passage of a vehicle through the entering and departing points of said test zone, movable means constituted to move along a path from a starting position, means to cause such movement, means responsive to said first signal constituted to release said movable means for movement along said path under the urge of said movement causing means, means constituted to respond to receipt of the second signal and to emit an activating signal when the movement of said movable means is less than a pre-determined amount corresponding to time lapse between the first and second signals for a pre-determined maximum speed; and each camera means including shutter actuating means and flash illumination producing means constituted to activate such shutter actuating means and said flash illumination producing means under control of said activating signal, at least a specified one of the flash illumination producing means being constituted for producing wave lengths outside of the visible range, and the camera corresponding to such specified flash illumination producing means including a picture recording element responsive to such wave lengths which are outside of the visible range.

2. A traffic speed violation recorder as defined in claim 1, wherein the specified flash illumination producing means is constituted for production of infra-red illumination; and wherein the corresponding picture recording element is responsive to wave-lengths in the infra-red zone of the spectrum.

3. A traffic speed violation recorder as defined in claim 2, wherein each of the flash illumination producing means is constituted for production of infra-red illumination; and wherein the camera picture recording element of each camera means, is responsive to wave-lengths in the infra-red zone of the spectrum.

4. A traffic speed violation recorder as defined in claim 1, wherein the flash illumination producing means which is constituted for producing wave-lengths outside of the visible range, and the picture recording element which is responsive to such wave-lengths outside of the visible range, are components of the front end viewing camera.

5. A traffic speed violation recorder as defined in claim 1, wherein there is included a single means constituted to respond to receipt of the second signal and to emit an activating signal when the movement of said movable means is less than a pre-determined amount corresponding to time lapse between the first and second signals for a pre-determined maximum speed; and wherein said activating signal activates the shutter actuating means and the flash illumination producing means, for both of the cameras.

6. In a traffic speed violation recorder, the combination of vehicle rear end and front end viewing cameras, means to support both of said cameras in position to view the rear and the front portions, respectively, of a vehicle passing through a test zone of pre-determined length, first and second vehicle actuated means constituted to emit first and second signals, simultaneously with passage of a vehicle through the entering and departing points of said test zone, means to determine the time lapse between emission of said first and second signals, means to emit an activating signal when such time lapse is less than a pre-determined interval, corresponding to a pre-determined maximum speed; each camera means including picture taking actuating means and flash illumination producing means, and means constituted to cause such picture taking means and said flash illumination producing means to function to produce a flash illumination and a picture taking operation simultaneously with receipt of an activating signal corresponding to said time lapse between the emission of said first and said second signals; wherein the flash illumination producing means of at least a specified one of the cameras is constituted for producing wave lengths outside of the visible range of the spectrum.

7. A traffic speed violation recorder as defined in claim 6, wherein the specified flash illumination producing means is constituted for production of infra-red illumination; and wherein the corresponding picture recording element is responsive to wave lengths in the infra-red zone of the spectrum.

8. A traffic speed violation recorder as defined in claim 7, wherein each of the flash illumination producing means is constituted for production of infra-red illumination; and wherein the camera picture recording element of each camera means, is responsive to wave-lengths in the infra-red zone of the spectrum.

9. A traffic speed violation recorder as defined in claim 6, wherein the flash illumination producing means which is constituted for producing wave-lengths outside of the visible range, and the picture recording element which is responsive to such wave-lengths outside of the visible range, are components of the front end viewing camera.

10. A traffic speed violation recorder as defined in claim 6, wherein there is included a single means constituted to respond to receipt of the second signal and to emit an activating signal when the time lapse is less than a pre-determined time interval, corresponding to a pre-determined maximum speed; and wherein said activating signal activates the picture taking means and the flash illumination producing means, for both cameras.

No references cited.

LEYLAND M. MARTIN, *Primary Examiner.*